Dec. 26, 1939.  G. W. WATSON ET AL  2,184,628
WELDING APPARATUS
Filed June 11, 1938
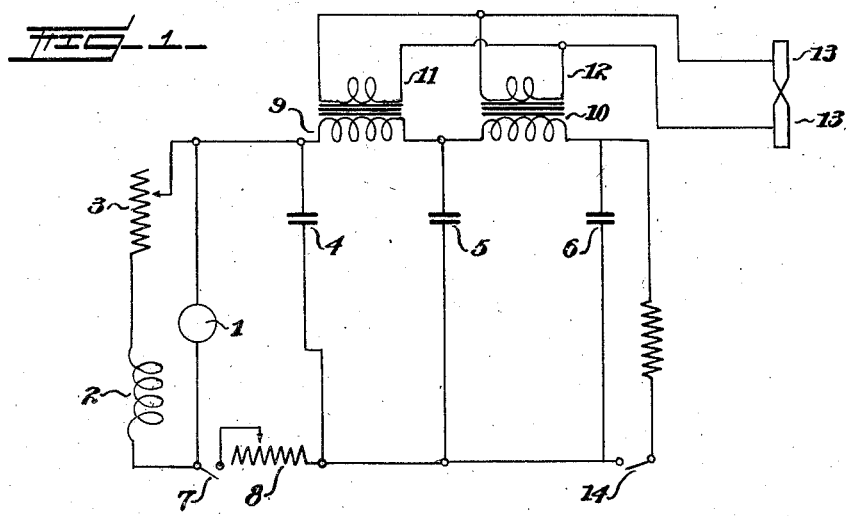
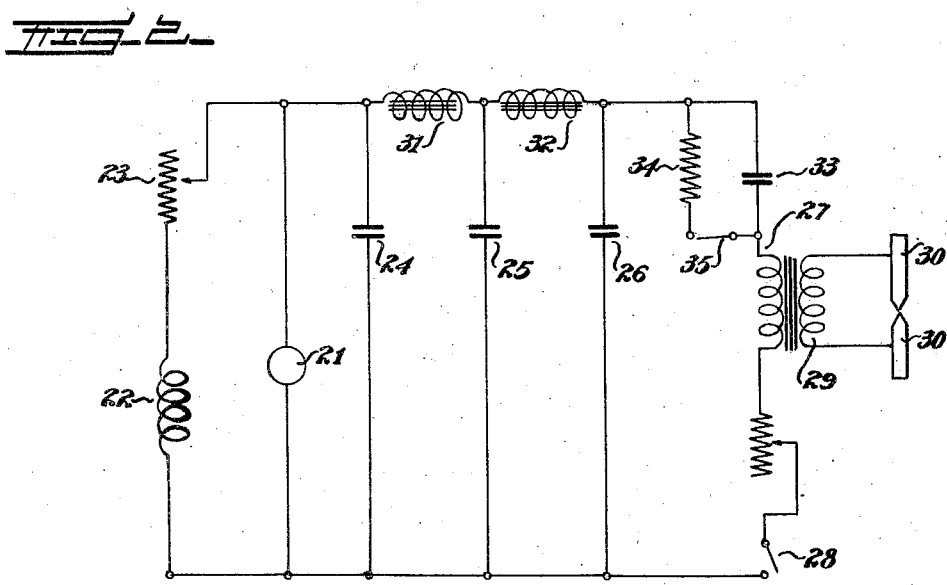
INVENTOR.
Glenn W. Watson.
Earle C. Brannas.
BY
Samuel Weisman
ATTORNEY Patented Dec. 26, 1939

2,184,628

UNITED STATES PATENT OFFICE 2,184,628

WELDING APPARATUS

Glenn W. Watson and Earle C. Brannas, Detroit, Mich., assignors to Penweld Corporation, Detroit, Mich., a corporation of Michigan Application June 11, 1938, Serial No. 213,196

5 Claims. (Cl. 219—4)

The present invention pertains to a novel apparatus for and method of welding.

The principal object of the invention is to enable the welding of stock as thin as .002 of an inch in a satisfactory manner. Hitherto the welding of such thin stock has been difficult, unreliable or unsatisfactory. The welding accomplished by this invention does not discolor the metal and is produced by means of spot welds of uniform diameter.

The object of the invention is accomplished primarily by the use of condensers in the generator circuit and by taking the welding current through inductance coils or the secondary windings of transformers or through both. Direct current flows from the generator and charges the condensers with the production of a current transient in each condenser. The peak voltage of the transient is several times the voltage of the generator but has only an instantaneous duration. The transients are also effective in the weld to which they are delivered through the inductances or transformers, as the case may be. The latter devices, however, retard or stagger the transient peaks in the welding circuit, causing the peaks of the several transients to occur successively rather than simultaneously. The duration of the peak voltage in the welding circuit is thereby multiplied, and the result is a highly satisfactory weld having the characteristics described above.

The invention is disclosed by way of example in the following description and in the accompanying drawing in which:

Figure 1 is a diagram of one embodiment of the invention, and

Figure 2 is a wiring diagram of a modification.

Reference to these views will now be made by use of like characters which are employed to designate corresponding parts throughout.

In Figure 1 the numeral 1 represents a source of direct current, such as a direct current generator. To the terminals of the generator are connected a shunt field coil 2 and a rheostat 3 to vary the generator voltage, the parts 2 and 3 being in series with each other.

Several condensers 4, 5 and 6 are connected across the generator and in parallel with each other. These may be of selected and different capacities, as indicated, according to requirements. At a convenient point between the generator 1 and the first condenser is an operating switch 7, and adjacent to this there may be provided a variable resistance 8.

Primary windings 9 and 10 are inserted respectively between adjacent condensers. The primary windings are in series additive with respect to each other. The corresponding secondary windings 11 and 12 are connected in parallel to each other and to the welding electrodes 13.

A switch 14 is connected across the several condensers and is closed when it is desired to discharge the condensers. During operation of the system for welding, the switch 14 must be open.

Shortly after the electrodes 13 are brought against the work for welding, an automatic device (not shown) closes the operating switch between the generator 1 and the condensers. There is a surge of current in the primary windings until the condensers are charged, whereupon the flow of current ceases. During this surge, however, the peak voltage exceeds many times the voltage of the generator. For example, if the generator delivers current at 300 volts, the peak of the transient may be as high as 3000 volts. The magnetic field in the primary windings and the induced current in the secondary windings are in proportion to the varying voltage transient occurring during the charging of the condensers.

The primary windings of the transformers have the effect of staggering the transfer of the transient peaks in the several condensers to the secondary circuit, so that the corresponding peak voltages in the secondary or welding circuit do not occur simultaneously. On the other hand, these peak voltages in the welding circuit have a comparatively prolonged duration which in turn has a beneficial effect on the character of the weld produced. The switch 14 is closed after each welding operation to discharge the condensers. A suitable automatic means may be provided for operating the switch 14 at the proper time.

In the modification shown in Figure 2, a direct current generator 21 is wired with a shunt field coil 22 and rheostat 23 as in Figure 1. Similarly, a series of condensers 24, 25, and 26 are wired across the generator. A primary winding 27 is also connected across the generator, and the flow of current therethrough is controlled by an operating switch 28. The secondary winding 29 of the transformer has the welding electrodes 30 in circuit therewith.

Between the several condensers are inductance choke coils 31 and 32 occupying the position of the primary windings 9 and 10 of Figure 1. A welding condenser 33 is connected in series with the primary winding 27. Across the condenser 33 is a resistance 34 and switch 35 for discharging the condenser when desired.

In the operation of this device, the condensers 24, 25, and 26 are constantly charged so long as the generator 21 or other source of current is active. When the electrodes 30 are brought together against the work, the switch 28 is also closed, preferably by an automatic device. Closing of the switch 28 permits the condenser 33 to be charged. Current is delivered to condenser 33, as well as to condensers 24, 25, and 26, in the form of a transient having a peak voltage several times higher than that of the generator. The corresponding peaks in the secondary circuit 29, 30 are, however, retarded by the inductances 31 and 32 in the same manner as by the primary windings 9 and 10 in Figure 1. The quality of the weld is comparable to that of the system shown in Figure 1. After the weld has been made, the switch 35 is closed to discharge condenser 33, and the operating switch 28 is opened, preferably before separating the electrodes 30. It will be evident that current flows in the secondary circuit only until the condenser 33 becomes charged. Thus, this condenser is an automatic means of limiting the amount of current delivered to the weld.

When the welding condenser 33 becomes fully charged, the back E. M. F. in the primary tends to maintain current in the secondary, which is of lower resistance, thereby increasing the duration of the welding current. When the weld is made, the welding condenser is charged and the other condensers likewise retain a charge at generator voltage, preventing the feed back or back E. M. F. from damaging the generator.

With suitable regulation of the current characteristics such as amperage, voltage, time and frequency, the apparatus and method disclosed herein can be used for heat treating metals and other materials.

Although specific embodiments of the invention have been illustrated and described, it will be understood that various alterations in the details of construction may be made without departing from the scope of the invention as indicated by the appended claims.

What we claim is:

1. In a welding apparatus, a primary circuit, a source of direct current therein and a plurality of condensers connected across said source, a secondary welding circuit adapted to receive current by induction from the primary circuit and adapted to weld while closed, and a means for successively retarding the delivery of the peak voltages in said condensers to said secondary circuit, whereby to prolong the peak voltage in the secondary circuit, and means for discharging said condensers outside of said welding circuit.

2. In a welding apparatus, a primary circuit, a source of direct current therein and a plurality of condensers connected across said source, a secondary welding circuit adapted to receive current by induction from the primary circuit and adapted to weld while closed, and a means in said primary circuit for successively retarding the delivery of the peak voltages in said condensers to said secondary circuit, whereby to prolong the peak voltage in the secondary circuit, and means for discharging said condensers outside of said welding circuit.

3. In a welding apparatus, a primary circuit, a source of direct current therein and a plurality of condensers connected across said source, a secondary welding circuit adapted to receive current by induction from the primary circuit and adapted to weld while closed, and a means between said condensers for successively retarding the delivery of the peak voltages in said condensers to said secondary circuit, whereby to prolong the peak voltage in the secondary circuit, and means for discharging said condensers outside of said welding circuit.

4. In a welding apparatus, a primary circuit, a source of direct current therein and a plurality of condensers connected across said source, a secondary welding circuit adapted to receive current by induction from the primary circuit, primary transformer windings between said condensers, and secondary windings in the secondary circuit and in inductive relation to said primary windings.

5. In a welding apparatus, a primary circuit, a source of direct current therein and a plurality of condensers in said primary circuit and connected across said source, a secondary welding circuit adapted to receive current by induction from the primary circuit, inductance choke coils between said condensers, another condenser in the primary circuit, and a switch for controlling flow of current to the last named condenser.

GLENN W. WATSON.
EARLE C. BRANNAS.